June 21, 1960
G. MATTUCCI
2,941,312
COLOR CORRECTION GAUGE
Filed July 9, 1958
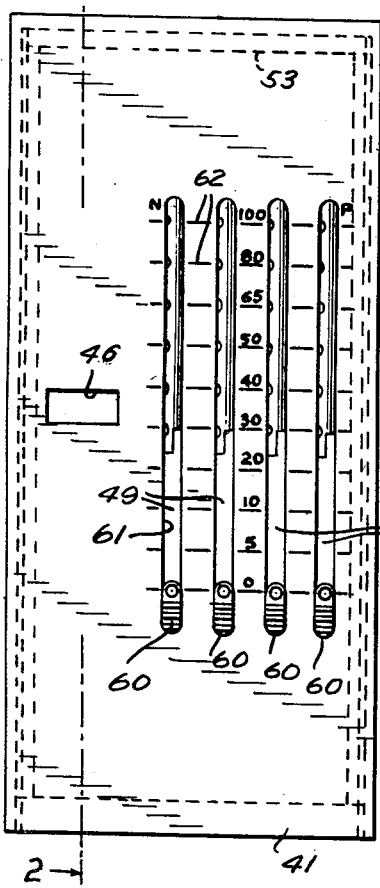
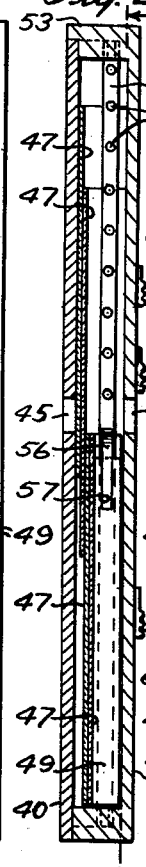
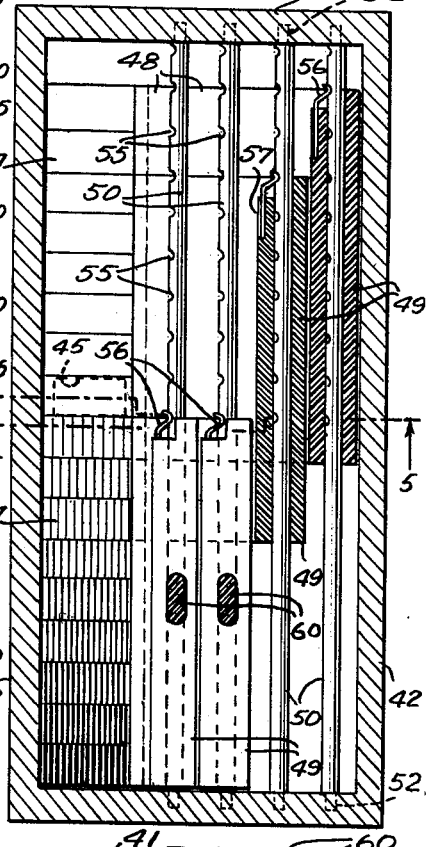
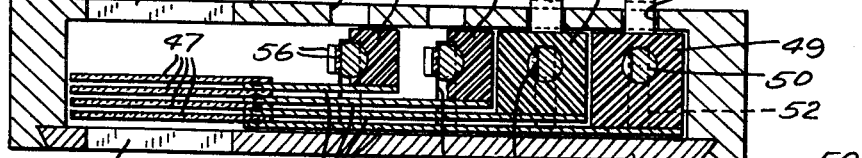
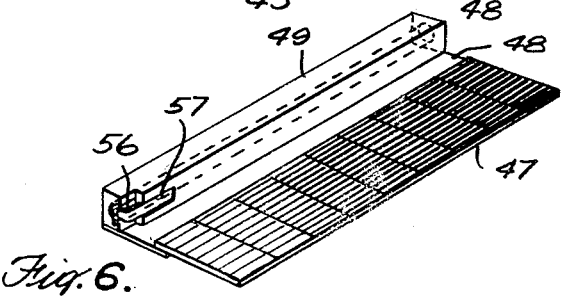
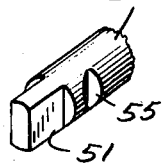
INVENTOR
GUIDO MATTUCCI
BY
ATTORNEY

United States Patent Office 2,941,312
Patented June 21, 1960

2,941,312

COLOR CORRECTION GAUGE

Guido Mattucci, 8550 Blvd. East, North Bergen, N.J.

Filed July 9, 1958, Ser. No. 747,407

1 Claim. (Cl. 35—28.3)

This invention relates to a color gauge which may be employed as a comparative guide in retouching photographic plates or films in connection with color printing operations and which is also useful for educational purposes.

In three color printing processes, blue, red and yellow, color separation negatives are made by the medium of color filters. In four color processes a black or brown separation negative is also made. These negatives, which are black and white, or grey, are retouched, black and white positives are made therefrom, which are further retouched or corrected, if necessary, and are used for making the corresponding printing plates.

One object of the present invention is to provide an improved color gauge, which is adapted to compose colors of any selective variety, value and intensity and which can be operated to translate the composed colors into corresponding grey representations, to serve as a comparative guide for retouching either the positives or negatives for use in color printing processes.

Another object is to provide a color separation gauge which may be made available on an economical basis for use in schools and the like for educational purposes.

Another object is to provide a simplified color gauge having novel and improved details of construction and features of operation.

Various other objects of the invention will be apparent from the following particular description and from an inspection of the accompanying drawings in which:

Fig. 1 is a top plan view of a form of color gauge embodying the invention;

Fig. 2 is a vertical section taken on the line 2—2 of Fig. 1 but with certain slides advanced;

Fig. 3 is a longitudinal section taken on the line 3—3 of Fig. 2;

Fig. 4 is an end elevation of the color gauge of Fig. 1;

Fig. 5 is a transverse section taken on the line 5—5 of Fig. 3 but on a larger scale;

Fig. 6 is a perspective of the slide block; and

Fig. 7 is a detail view of a portion of a slide rod.

In the color gauge of Figs. 1 to 7 the device is shown as having a back panel 40 and a front panel 41 provided with side flanges 42 forming a closure. The panels 40 and 41 have windows 45 and 46.

Films 47 are composed of a suitable thin transparent or light pervious material colored to correspond to the various separation colors, for example the four films shown may be colored blue, yellow, red and grey or brown respectively. The color intensity or shading of the films increases downwardly in successive areas so that the lighter shade is at the top and the darker shade corresponding to the full color is at the bottom. The films 47 are secured to a flat plate 48 which may be made of cardboard, plastic, or other suitable material, are secured to slide blocks 49 which are made of plastic or other suitable material. The slides 49 are rectangular in section and are adapted to lie closely adjacent one another when in place in the color gauge.

Each slide block 49 is slidable on a rod 50 which passes longitudinally therethrough. The rods 50 are formed with flat ends 51 which are inserted in grooves 52 in walls 53 at each end of the back panel 40. The flat ends of the rods prevent the rods from turning when in place in the walls 53.

Each rod 50 is formed with a series of notches 55 on the upper surface and positioning detents 56 are secured in recesses 57 in slide blocks 49 to engage the recesses 57 for positioning the slides along the rods 50.

Finger pieces 60 are attached to slide blocks 49 and extend through parallel slots 61 in the front panel 41 for actuation by the operator.

Suitable scales 62 are provided on the front panel 41 to designate the positions of the slides along the rods 50.

In order to analyze a color for three or four color printing, the different slides 47 may be set along their respective guide slots until the required color composition is produced and displayed through the window opening. The setting of these slides on the scales 62 is then notched and the slides returned to their lowermost positions. The slide carrying the grey film is then moved along the guide slots into the different indicated positions on the scales 62 to disclose the correct corresponding shades of grey for the respective color separation negatives. The negatives are then retouched if necessary.

The graduated films 47 are brought into registration with the windows 45 and 46. The films 47 are disposed in alignment so that all films are viewable through the windows when so positioned.

Although certain embodiments of the invention have been shown, it is to be understood that the invention may be embodied in various forms and may be adapted to various uses as will be apparent to a person skilled in the art.

What is claimed is:

A color gauge for use as a retouching guide in connection with color printing, comprising a housing having front and back panels provided with registering window openings, one of said panels having grooves therein, a plurality of rods mounted in and held in predetermined position by said grooves, a slide carried by each of said rods for movement along the same, a film carried by each of said slides in a position to be advanced over said window openings, said films varying in shade from top to bottom, said films being slidable with said slides to bring selected color areas thereof into overlapping registration with said window openings whereby a selected color can be composed by relative adjustment of the various slides, all of said films having identical shade value and variations from top to bottom whereby shade values can be determined and transposed from one color to another by making identical adjustments of the respective films.

References Cited in the file of this patent

UNITED STATES PATENTS

| | | |
|---|---|---|
| 2,597,658 | Mattucci | May 20, 1952 |
| 2,841,876 | Pittenger | July 8, 1958 |